(12) United States Patent
Fey et al.

(10) Patent No.: US 10,753,259 B2
(45) Date of Patent: Aug. 25, 2020

(54) METHOD AND CONTROL DEVICE FOR CORRECTING AN OUTPUT SIGNAL OF AN EXHAUST GAS SENSOR

(71) Applicant: Robert Bosch GmbH, Stuttgart (DE)

(72) Inventors: Michael Fey, Wiernsheim (DE); Michael Pfeil, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 15/629,920

(22) Filed: Jun. 22, 2017

(65) Prior Publication Data
US 2017/0370267 A1 Dec. 28, 2017

(30) Foreign Application Priority Data
Jun. 28, 2016 (DE) .................. 10 2016 211 608

(51) Int. Cl.
*F01N 3/10* (2006.01)
*F01N 11/00* (2006.01)
(Continued)

(52) U.S. Cl.
CPC .............. *F01N 11/00* (2013.01); *F01N 3/021* (2013.01); *F01N 3/035* (2013.01); *F01N 3/05* (2013.01); *F01N 3/10* (2013.01); *F01N 3/101* (2013.01); *F01N 3/22* (2013.01); *F01N 11/007* (2013.01); *F02D 41/042* (2013.01); *F02D 41/1454* (2013.01); *F02D 41/1495* (2013.01);
(Continued)

(58) Field of Classification Search
CPC ........ F01N 11/00; F01N 11/007; F01N 3/021; F01N 3/035; F01N 3/05; F01N 3/10; F01N 3/101; F01N 3/22; F02D 41/042; F02D 41/1454; F02D 41/1495; F02D 41/22
See application file for complete search history.

(56) References Cited

U.S. PATENT DOCUMENTS 4,705,012 A * 11/1987 Kawanabe .......... F02D 41/1488
123/684
5,257,501 A * 11/1993 Wataya ................ F01N 3/2013
123/179.21
(Continued)

FOREIGN PATENT DOCUMENTS

DE     19536577 A1    4/1997
DE     19734670 C1    5/1999
(Continued)

*Primary Examiner* — Matthew T Largi
(74) *Attorney, Agent, or Firm* — Norton Rose Fulbright US LLP; Gerard Messina

(57) ABSTRACT

A method and control device for correcting an output signal of an exhaust gas sensor in an exhaust gas conduit of an internal combustion engine, a secondary air delivery system for delivering air into the exhaust gas conduit being associated with the exhaust gas conduit upstream from the exhaust gas sensor in the flow direction of the exhaust gas. During a measurement of the output signal of the exhaust gas sensor, air is delivered to the exhaust gas conduit via the secondary air delivery system during a correction phase by way of which a correction of the output signal of the exhaust gas sensor is derived. In this operating mode, a defined oxygen content exists in the gas mixture surrounding said sensor, so that the output signal can be compared with reference values.

15 Claims, 1 Drawing Sheet

(51) Int. Cl.
  *F01N 3/035* (2006.01)
  *F01N 3/22* (2006.01)
  *F02D 41/04* (2006.01)
  *F02D 41/22* (2006.01)
  *F02D 41/14* (2006.01)
  *F01N 3/021* (2006.01)
  *F01N 3/05* (2006.01)

(52) U.S. Cl.
  CPC .......... *F02D 41/22* (2013.01); *F01N 2270/00* (2013.01); *F01N 2550/14* (2013.01); *F01N 2560/025* (2013.01); *F01N 2560/14* (2013.01); *F01N 2900/0416* (2013.01); *Y02T 10/22* (2013.01); *Y02T 10/47* (2013.01)

(56) References Cited

U.S. PATENT DOCUMENTS

| | | | | |
|---|---|---|---|---|
| 6,167,754 | B1* | 1/2001 | Koenders | F02D 35/0038 60/274 |
| 6,195,985 | B1* | 3/2001 | del Re | B60K 6/46 60/274 |
| 7,077,224 | B2* | 7/2006 | Tomatsuri | B60K 3/00 123/142.5 R |
| 2005/0028517 | A1* | 2/2005 | Nakagawa | F01N 3/101 60/285 |
| 2013/0289848 | A1* | 10/2013 | Kociba | F02D 41/123 701/103 |
| 2015/0142231 | A1* | 5/2015 | Ledermann | B60K 6/48 701/22 |

FOREIGN PATENT DOCUMENTS

DE    10 2013 201 316 A1    8/2013
DE    102013201257 A1    7/2014

* cited by examiner

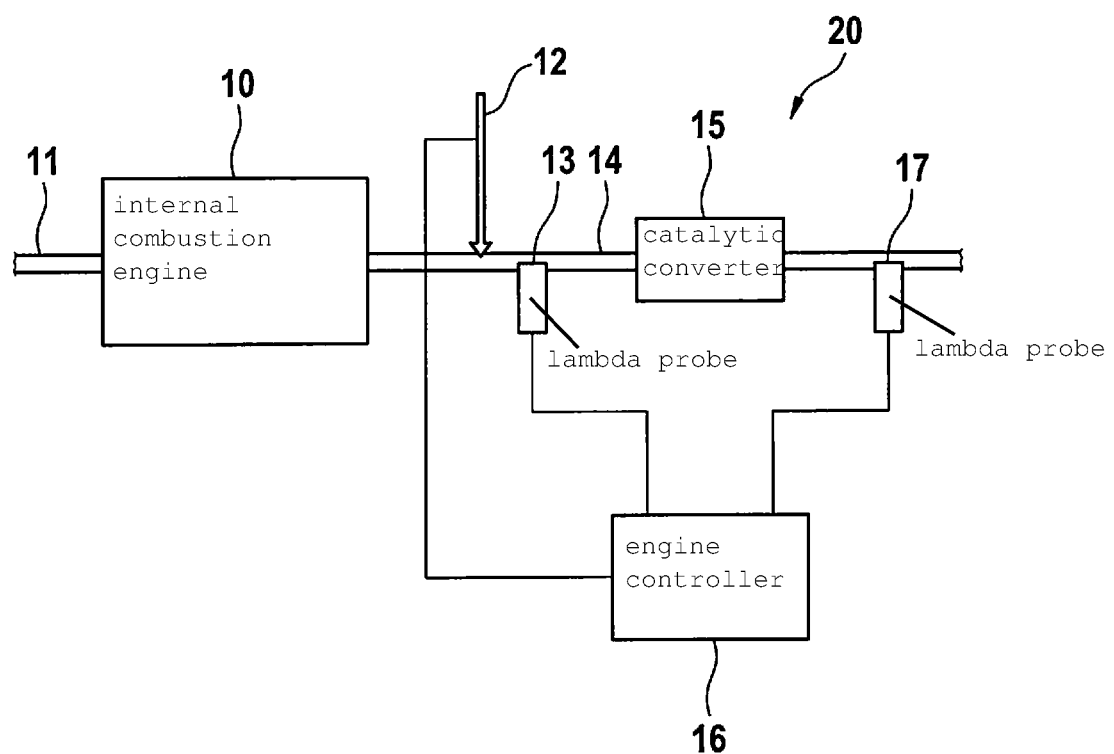

METHOD AND CONTROL DEVICE FOR CORRECTING AN OUTPUT SIGNAL OF AN EXHAUST GAS SENSOR

CROSS REFERENCE

The present application claims the benefit under 35 U.S.C. § 119 of German Patent Application No. DE 102016211608.8 filed on Jun. 28, 2017, which is expressly incorporated herein by reference in its entirety.

FIELD

The present invention relates to a method for correcting an output signal of an exhaust gas sensor in an exhaust gas conduit of an internal combustion engine, a secondary air delivery system for delivering air into the exhaust gas conduit being associated with the exhaust gas conduit upstream from the exhaust gas sensor in the flow direction of the exhaust gas.

The present invention furthermore relates to a control device for carrying out the method.

BACKGROUND INFORMATION

Exhaust gas sensors are used in control systems for internal combustion engines in order to detect concentrations of various exhaust gas constituents and in order to implement a variety of control and regulation functions. In order to regulate the composition of an air/fuel mixture for the operation of internal combustion engines, the oxygen content of the exhaust gas is determined in their exhaust gas conduit by way of exhaust gas sensors (lambda probes). An unequivocal correlation between the variable to be measured, the lambda value, and the output signal of the lambda probe (the probe voltage) is necessary for correct operation of the lambda probe over the entire service life, taking into consideration aging effects and tolerances. In order to compensate for tolerances and aging effects it is known to perform a comparison, during coasting phases and while excess oxygen is present in that context in the exhaust gas conduit, of the probe characteristic curve with a reference characteristic curve, and to derive therefrom a correction of the output signal of the lambda probe. What can in fact be achieved with such a procedure is that constant regulation of the lambda value can be carried out by way of a two-point lambda probe upstream from the first catalytic converter in the exhaust section.

Suitable coasting phases are becoming increasingly rare in more recent vehicle concepts, however, for example hybrid drives made up of internal combustion engines and electric drives, or drivetrain gliding, so that correction in a context of an excess of air cannot occur, or at least cannot occur often enough.

A secondary air inlet, which enables optimum operation of a catalytic converter or particle filter mounted downstream from it in the exhaust gas conduit by the fact that its operating temperature is reached more quickly or regeneration is better enabled, is present in some cases in exhaust gas systems of internal combustion engines.

German Patent Application No. DE 10 2013 201 257 A1 describes a method in particular for off-highway applications in which coasting phases for carrying out calibration of the lambda probe are not, or not sufficiently, present, in which method upon shutoff of the internal combustion engine firstly its rotation speed is elevated and then fuel delivery is interrupted. In the run-on of the internal combustion engine that then occurs, air is drawn in by it and discharged into the exhaust gas conduit. In this phase a sufficiently high oxygen concentration for calibration of the lambda probe exists. German Patent Application No. DE 10 2013 201 257 A1 is therefore based on the same object as the present invention, but the excess air is generated in a completely different way.

German Patent Application No. DE 10 2013 201 316 A1 describes the generation of excess air in the region of an exhaust system by the fact that in a coasting mode of the internal combustion engine, the internal combustion engine is driven by an electric motor of the drive unit embodied as a hybrid drive. An excess air concentration is thereby generated in the exhaust gas conduit, and calibration of an exhaust gas probe disposed therein is enabled.

German Patent No. DE 197 34 670 C1 describes a method with which lambda probes connected in transposed fashion can be detected in internal combustion engines having multiple outlet ducts. For testing, air is delivered by way of an air source (secondary air pump) individually to at least one exhaust gas duct upstream from a respective lambda probe. Based on the change in the lambda signal which results therefrom, it is possible to check whether the lambda probes are correctly connected or have been transposed.

German Patent No. DE 195 36 577 C2 describes a method for checking the functionality of a heating device of a lambda probe. An operating state of the internal combustion engine in which a lean mixture is definitely present is selected for this purpose. The probe voltage is regulated by way of the heating device to a predetermined diagnostic target value. A fault in the heating device is detected if the diagnostic target value is not reached within a predetermined time. The operating state can be brought about by way of an injection of secondary air into the exhaust section.

An object of the present invention is to provide a method that enables correction of an output signal of an exhaust gas sensor with excess air in the exhaust gas, independently of an availability of coasting phases in the context of the operation of an internal combustion engine.

A further object of the present invention is to provide a control device suitable for carrying out the method.

SUMMARY

In accordance with example embodiments of the present invention, during a measurement of the output signal of the exhaust gas sensor, air is delivered to the exhaust gas conduit via the secondary air delivery system during a correction phase by way of which a correction of the output signal of the exhaust gas sensor is derived. In this operating mode of the exhaust gas sensor with excess air, a defined oxygen content exists in the gas mixture surrounding said sensor, so that the output signal can be compared with reference values. As also in the case of a correction in coasting mode or in a run-on phase of an engine controller, the output signal can then be corrected and a shift of the probe characteristic curve can also be performed in order to compensate for tolerances or aging effects. The method does not rely on a sufficiently frequent occurrence of coasting phases, which occur only seldom in vehicle concepts such as a hybrid drive or drivetrain gliding. If the correction according to the present invention is applied, for example, to a two-point lambda probe in the exhaust gas conduit downstream from the internal combustion engine and upstream from a catalytic converter, the two-point lambda probe can be used in a wide lambda range for continuous lambda regulation. In addition, functions such as catalytic converter diagnosis and component protection can thus also be implemented when a two-point lambda probe is used, and diagnoses that depend on a continuous lambda regulation can be run more frequently.

If the delivery of air during the correction phase is begun a predefinable time interval before measurement of the output signal, undefined gas mixture can be removed from the exhaust gas conduit around the exhaust gas sensor and that section can be flushed with well-defined ambient air, so that for correction, a defined gas mixture is present in the vicinity of the exhaust gas sensor.

Mixing of exhaust gas into the exhaust gas conduit can be prevented by carrying out the correction of the output signal of the exhaust gas sensor with the internal combustion engine shut off.

The correction can be accomplished with the internal combustion engine shut off, without interrupting the operation of a vehicle driven by it, by the fact that the correction phase occurs during a stoppage phase or during a gliding mode or during a control unit run-on or during a coasting mode or during a drive phase using an electric motor.

The exhaust gas sensor can deliver a usable output signal only if it is operable or at least operable to a limited extent. In particular, the exhaust gas sensor must be operated at its nominal temperature or at least at a temperature that permits a correlation of the output signal with the output signal at the nominal temperature. Provision is therefore made according to the present invention that the operability, in particular the temperature, of the exhaust gas sensor is monitored, and that the correction of the output signal of the exhaust gas sensor occurs only if operability exists.

In a refinement of the present invention, provision is made that the operability of the secondary air delivery system and/or of an energy supply system of the secondary air delivery system is monitored, and the correction of the output signal of the exhaust gas sensor occurs only if operability exists; and/or that an operating state of at least one further exhaust gas post-treatment component, in particular of a catalytic converter or a particle filter, within the exhaust gas conduit is monitored, and the correction of the output signal of the exhaust gas sensor occurs only if a suitable operating state exists. Provision is further made to perform the secondary air infeed only if the state of the vehicle battery and of the vehicle electrical system permits it. This furthermore prevents an exothermic reaction from possibly overheating and damaging the catalytic converter disposed downstream from the secondary air delivery system. It furthermore prevents overloading of a secondary air pump in the secondary air delivery system.

An improvement in the correction of the output signal of the exhaust gas probe can be achieved by the fact that a plausibilization of the correction, carried out during a delivery of secondary air, of the output signal of the exhaust gas sensor is carried out by way of a comparison with a correction carried out during a coasting phase of the internal combustion engine (without delivery of secondary air), or by the fact that a plausibilization of the correction, carried out during a delivery of secondary air, of the output signal of the exhaust gas sensor is carried out by way of a comparison with at least one correction carried out during a previous delivery of secondary air.

In preferred variant of the method according to the present invention, an urgency of a need for correction of the output signal of the exhaust gas sensor is determined, and the correction is carried out during a delivery of secondary air if the urgency exceeds a predefinable value. Provision can be made, for example, that a correction is carried out if it is occurring for the first time or if the most recent correction is already long past. The urgency of a need for a correction can also be raised if a replacement of the exhaust gas sensor is reported.

One particularly suitable application of the method according to the present invention is utilization thereof for correcting the output signal of a two-point lambda probe or of a broadband lambda probe.

In accordance with example embodiments of the present invention, a control device is embodied to carry out a correction of the output signal during the delivery of air into the exhaust gas conduit by the secondary air delivery system. Thanks to the control device embodied in this fashion, a correction of the output signal of the exhaust gas sensor can occur in an environment having excess air, and a defined oxygen content exists in the gas mixture surrounding said sensor, so that the output signal can be compared with reference values. As also in the case of a correction in coasting mode or in a run-on phase of an engine controller, the output signal can then be corrected and, for example, a shift of the probe characteristic curve can also be performed in order to compensate for tolerances or aging effects. The correction does not rely on a sufficiently frequent occurrence of coasting phases, which occur only seldom in vehicle concepts such as a hybrid drive or drivetrain gliding.

In an embodiment, provision is made that the control device is embodied to carry out at least the following steps:
  determining an urgency of a need for correction of the output signal of the exhaust gas sensor;
  applying control to the secondary air delivery system during a shut-off phase of the internal combustion engine upon exceedance of a predefinable urgency.

The present invention is explained in further detail below with reference to an exemplifying embodiment depicted in the FIGURE.

BRIEF DESCRIPTION OF THE FIGURE

FIG. 1 shows an internal combustion engine having an air delivery system and an exhaust system.

DETAILED DESCRIPTION OF EXAMPLE EMBODIMENTS

FIG. 1 schematically depicts an internal combustion engine 10 having an air delivery system 11 and an exemplifying exhaust system 20. Exhaust system 20 encompasses an exhaust gas conduit 14 in which exhaust gas of internal combustion engine 10 is guided, a secondary air delivery system 12, a first lambda probe 13, a catalytic converter 15, and a second lambda probe 17. Catalytic converter 15 can be embodied, for example, as a three-way catalytic converter and can optionally be combined with a particle filter. The output signals of first lambda probe 13 and of second lambda probe 17 are delivered to an engine controller 16 that can also apply control to secondary air delivery system 12. Secondary air delivery system 12 becomes activated when catalytic converter 15 needs to be brought quickly to operating temperature. For this, the internal combustion engine is operated with a rich air/fuel mixture, and the hydrocarbons and carbon monoxide emitted in that context from internal combustion engine 10 are combusted in the catalytic converter with secondary air mixed in. Once catalytic converter 15 has reached its operating temperature, internal combustion engine 10 continues to be operated with a stoichiometric air/fuel mixture.

In order to check first lambda probe 13 and/or second lambda probe 17, according to the present invention outside air is blown into exhaust gas conduit 14 via secondary air delivery system 12 disposed in exhaust gas conduit 14 upstream from first lambda probe 13. This is accomplished preferably in an operating phase of internal combustion engine 10 in which no combustion is taking place, since there is then a particularly high excess air level. This can take place, for example, during a stoppage phase, during operation of a hybrid drive with an electric motor, or after a shutoff of internal combustion engine 10 in a run-on phase of engine controller 16. First lambda probe 13 and/or second lambda probe 17 must be at a suitable operating temperature for the check. From a comparison of the output signal of first lambda probe 13 and/or of second lambda probe 17 with a reference, a correction for the output signal can be determined and can be taken into consideration in determining the composition of the exhaust gas.

If first lambda probe 13 is embodied as a two-point lambda probe, then as a result of the correction according to the present invention, first lambda probe 13 can be used for continuous lambda regulation and for functionalities dependent thereon, such as catalytic converter diagnosis and component protection. Because the correction can be carried out even without the coasting phases used in accordance with the existing art for such a correction, the frequency with which corrections are run can be increased, or a correction can also be made possible in the first place.

What is claimed is:

1. A method for correcting an output signal of an exhaust gas sensor in an exhaust gas conduit of an internal combustion engine, a secondary air delivery system for delivering air into the exhaust gas conduit being associated with the exhaust gas conduit upstream from the exhaust gas sensor in a direction of flow of the exhaust gas, the method comprising:
    during measuring of the output signal of the exhaust gas sensor, delivering air to the exhaust gas conduit via the secondary air delivery system during a correction phase by way of which a correction of the output signal of the exhaust gas sensor is derived, wherein for the delivering of the air, the secondary air delivery system delivers the air through a secondary air inlet in the exhaust gas conduit between the internal combustion engine and the exhaust gas sensor; and
    carrying out a plausibilization of the correction of the output signal of the exhaust gas sensor by:
        (i) comparing: (a) the correction of the output signal of the exhaust gas sensor, with (b) a first previous correction carried out during a coasting phase of the internal combustion engine without delivery of air by the secondary air delivery system, or
        (ii) comparing: (a) the correction of the output signal of the exhaust sensor, with (b) a second previous correction carried out during a previous delivery of air by the secondary air delivery system.

2. The method as recited in claim 1, wherein the delivery of air during the correction phase is begun a predefinable time interval before measurement of the output signal.

3. The method as recited in claim 1, wherein the correction of the output signal of the exhaust gas sensor is carried out with the internal combustion engine shut off.

4. The method as recited in claim 3, wherein the correction phase occurs:
    (i) during a stoppage phase, or (ii) during a gliding mode, or (iii) during a control unit run-on, or (iv) during a coasting mode, or (iv) during a drive phase using an electric motor.

5. The method as recited in claim 1, further comprising:
    monitoring operability of the exhaust gas sensor by monitoring a temperature of the exhaust gas sensor; and
    correcting the output signal of the exhaust gas sensor occurs only if operability exists.

6. The method as recited in claim 1, further comprising:
    monitoring operability of at least one of the secondary air delivery system and an energy supply system of the secondary air delivery system;
    correcting the output signal of the exhaust gas sensor only if operability exists.

7. The method as recited in claim 1, further comprising:
    monitoring an operating state of at least one of a catalytic converter and a particle filter, within the exhaust gas conduit; and
    correcting the output signal of the exhaust gas sensor occurs only if a predefined operating state exists.

8. The method as recited in claim 1, further comprising:
    carrying out the plausibilization of the correction of the output signal of the exhaust gas sensor, by comparing the correction of the output signal of the exhaust gas sensor with the first previous correction carried out during the coasting phase of the internal combustion engine without delivery of air by the secondary air delivery system.

9. The method as recited in claim 1, further comprising:
    carrying out the plausibilization of the correction of the output signal of the exhaust gas sensor, by comparing the correction of the output signal of the exhaust gas sensor with a second previous correction carried out during the previous delivery of air by the secondary air delivery system.

10. The method as recited in claim 1, further comprising:
    determining an urgency of a need for correction of the output signal of the exhaust gas sensor; and
    carrying out the correction during a delivery of secondary air if the urgency exceeds a predefinable value.

11. The method as recited in claim 1, wherein the exhaust gas sensor is one of a two-point lambda probe or a broadband lambda probe.

12. A device for correcting an output signal of an exhaust gas sensor in an exhaust gas conduit of an internal combustion engine, a secondary air delivery system for delivering air into the exhaust gas conduit being associated with the exhaust gas conduit upstream from the exhaust gas sensor in a direction flow of the exhaust gas, the device comprising:
    a control device configured to carry out a correction of the output signal of the exhaust gas sensor during a delivery of air into the exhaust gas conduit by the secondary air delivery system, wherein for the delivering of the air, the secondary air delivery system delivers the air through a secondary air inlet in the exhaust gas conduit between the internal combustion engine and the exhaust gas sensor; and
    the control device further configured to carry out a plausibilization of the correction of the output signal of the exhaust gas sensor by:
        (i) comparing: (a) the correction of the output signal of the exhaust gas sensor, with (b) a first previous correction carried out during a coasting phase of the internal combustion engine without delivery of air by the secondary air delivery system, or (ii) comparing: (a) the correction of the output signal of the exhaust sensor, with (b) a second previous correction carried out during a previous delivery of air by the secondary air delivery system.

13. The device as recited in claim 12, wherein the control device is configured to determine an urgency of a need for correction of the output signal of the exhaust gas sensor, and apply control to the secondary air delivery system during a shut-off phase of the internal combustion engine upon exceedance of a predefinable urgency.

14. The device as recited in claim 12, wherein the correction of the output signal of the exhaust gas sensor is carried out with the internal combustion engine shut off.

15. The device as recited in claim 14, wherein the correction phase occurs: (i) during a stoppage phase, or (ii) during a gliding mode, or (iii) during a control unit run-on, or (iv) during a coasting mode, or (iv) during a drive phase using an electric motor.

* * * * *